United States Patent
Mangone, Jr.

[11] Patent Number: 6,021,982
[45] Date of Patent: Feb. 8, 2000

[54] CABLE CLIP

[76] Inventor: Peter G. Mangone, Jr., 28600 Buchanan Dr., Evergreen, Colo. 80439

[21] Appl. No.: 08/307,328
[22] Filed: Sep. 16, 1994
[51] Int. Cl.[7] ........................................................ F16L 3/08
[52] U.S. Cl. ........................ 248/74.5; 174/166 R; 411/485
[58] Field of Search ................................ 248/74.5, 74.1, 248/74.4, 71, 500, 510; 174/158 F, 164, 166, 159; 411/485, 400

[56] References Cited

U.S. PATENT DOCUMENTS

| | | | |
|---|---|---|---|
| 627,819 | 6/1899 | Cummings | 411/485 X |
| 633,909 | 9/1899 | Sanford | 411/485 X |
| 3,951,367 | 4/1976 | Hangelberg | 248/71 |
| 4,588,152 | 5/1986 | Ruehl et al. | 248/74.5 X |
| 4,832,557 | 5/1989 | Jacobsen | 411/485 |
| 4,903,920 | 2/1990 | Merrit | 248/71 |
| 4,903,921 | 2/1990 | Logsdon | 248/74.5 |
| 5,054,741 | 10/1991 | Ismert | 248/74.5 |

FOREIGN PATENT DOCUMENTS

| | | | |
|---|---|---|---|
| 1077284 | 3/1960 | Germany | 248/74.5 |
| 2937495 | 3/1980 | Germany | 248/166 R |

OTHER PUBLICATIONS

ANIXTER Catalogue pp. D–11, D–32, "Siding Clips with Nails".

*Primary Examiner*—Ramon O. Ramirez
*Attorney, Agent, or Firm*—Klaas, Law, O'Meara & Malkin; Joseph J. Kelly, Esq.

[57] ABSTRACT

A cable clip for attaching a cable to a support using a plastic housing having a bottom cable receiving channel and a bore extending therethrough and a metallic surface penetrating fastening device having a stem portion, part of which is located in the bore and an integral arm portion projecting outwardly therefrom so that, when the stem portion is driven into the support, portions of the arm portion will be superposed over portions of the top and front surfaces of the plastic housing to provide reinforcement.

20 Claims, 1 Drawing Sheet

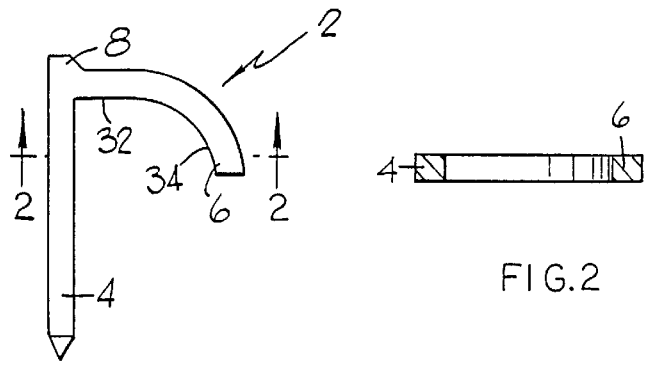
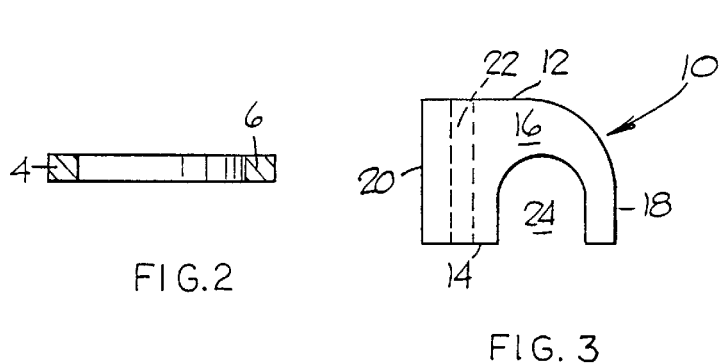
FIG.1  FIG.2  FIG.3
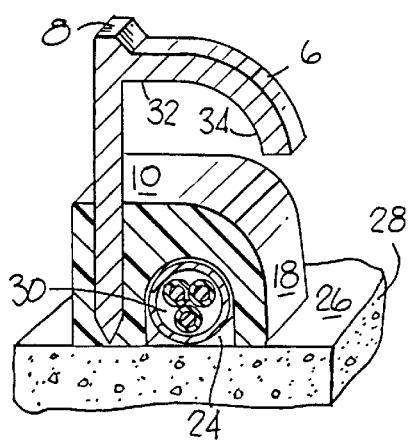
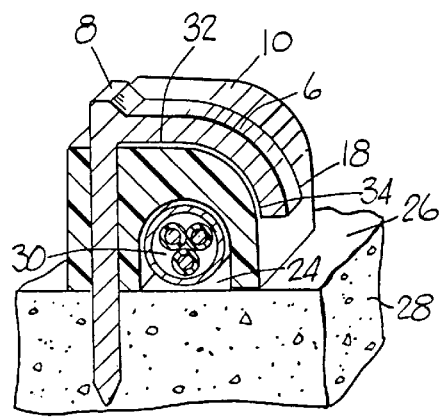
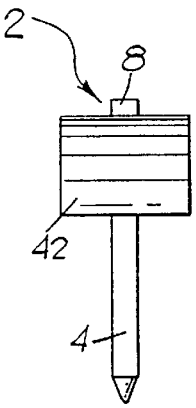
FIG 4  FIG.5  FIG.6
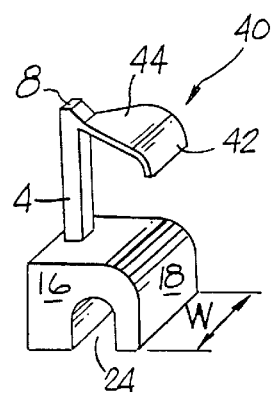
FIG.7

CABLE CLIP

FIELD OF THE INVENTION

This invention is directed generally to cable clips for use in attaching cable to a support and more particularly to a cable clip having a plastic housing and a metallic fastening device.

BACKGROUND OF THE INVENTION

There are many types of cable clips for attaching a cable to a support. In one type, the cable clip comprises a plastic housing having a cable receiving channel in its bottom surface. A bore extends through the housing and has a portion of a surface penetrating fastening device located therein. In use, the cable clip is positioned over the cable and a force is applied to the surface penetrating fastening device to drive it into the support. If the housing is not located properly, there is a possibility that weather conditions could effect the side of the housing opposite to the bore causing it to sag and no longer support the cable. In other types of cable clips, the housing and the fastening device, which may be a nail or a screw, are made from metal. This later type of cable clip is more expensive.

BRIEF DESCRIPTION OF THE INVENTION

This invention provides a cable clip that has plastic housing and a metallic fastening device having an integral reinforcing portion.

In a preferred embodiment of the invention, the cable clip comprises a housing having at least top and bottom surfaces, two opposite side surfaces and front and rear surfaces with the bottom surface having a cable receiving channel formed therein. The housing has a bore extending therethrough which bore has an opening in the top surface and an opening in the bottom surface. A surface penetrating fastening device has a stem portion and an integral arm portion projecting outwardly from the stem portion. At least a portion of the stem portion is located in at least a portion of the bore so that the arm portion is spaced from and extends over the top surface. The arm portion has a bottom surface so that when a force is applied to the surface penetrating fastening device to drive the stem portion into the support at least a portion of the bottom surface of the arm portion will be superposed over at least a portion of the top surface and at least another portion of the bottom surface of the arm portion will be superposed over at least a portion of the front surface. This at least another portion functions as a reinforcing member to prevent movement of the front surface. The bore and the stem portions have cross-sectional configurations that prevent relative rotational movement therebetween such as being rectangular, polygonal or oval. In a preferred embodiment, the cross-sectional configuration is rectangular and the arm portion has the same rectangular cross-sectional configuration. The housing is preferably formed from a molded plastic material, such as high density polyethylene, or other materials having similar characteristics. The surface penetrating fastening device is preferably formed from medium carbon steel, or other materials having similar characteristics, for use with stucco, block, mortar, brick or wood. In another preferred embodiment of the invention, the portion of the bottom surface of the arm portion superposed over the top surface of the housing tapers from a first location adjacent to the at least another portion to a second location adjacent to the stem portion.

BRIEF DESCRIPTION OF THE DRAWINGS

Illustrative and presently preferred embodiments of the invention are illustrated in the drawing in which:

FIG. 1 is a side elevational view of a surface penetrating device of this invention;

FIG. 2 is a cross-sectional view taken on the line 2—2 of FIG. 1;

FIG. 3 is a side elevational view of a housing of this invention;

FIG. 4 is a perspective view with parts in section prior to the surface penetrating device being driven into the support;

FIG. 5 is a perspective view with parts in section after the surface penetrating fastening device has been driven into the support;

FIG. 6 is a front elevation view of another preferred embodiment of the invention; and FIG. 7 is a perspective view of showing the surface penetrating fastening device of FIG. 6 positioned in a housing.

DETAILED DESCRIPTION OF THE INVENTION

In FIGS. 1 and 2, there is illustrated a surface penetrating fastening device 2 of this invention having a stem portion 4 having a smooth outer surface, an integral arm portion 6 projecting outwardly from the stem portion 4 and an integral head portion 8. As illustrated in FIG. 2, the stem portion 4 and the arm portion 6 have a rectangular cross-sectional configuration and are formed from a metallic material such as that described above.

In FIGS. 3–5, there is illustrated a housing 10 for use in this invention. The housing 10 has a top surface 12, a bottom surface 14, opposite side surfaces 16, a front surface 18 and a back surface 20. The housing 10 has a bore 22 extending therethrough which bore 22 has a rectangular cross-sectional configuration the same as the cross-sectional configuration of the stem portion 4 to prevent any relative rotational movement between the stem portion 4 and the bore 22. The cross-sectional configuration of the stem portion 4 and the bore 22 can be of other configurations as long as relative rotational movement therebetween is prevented. The housing 10 has a cable receiving channel 24 formed in the bottom surface 14. The housing 10 is formed from a plastic material such as that described above.

The operation of the invention is illustrated in FIGS. 4 and 5. In FIG. 4, a portion of the stem portion 4 has been inserted into the bore 22. This is preferably done at the manufacturing facility. The housing 10 is positioned on the surface 26 of a support 28 with the cable 30 located in the cable receiving channel 24. In FIG. 5, a force has been applied to the head portion 8 to drive the stem portion 4 into the support 28. The arm portion 6 moves with the stem portion 4 so that a portion 32 thereof is superposed over and in contact therewith a portion of the top surface 12 and another portion 34 thereof is superposed over and in contact therewith a portion of the front surface 18. The another portion 34 functions as a reinforcing member to hold the front surface 18 in place.

In FIGS. 6 and 7, there is illustrated another preferred embodiment of the invention. In this embodiment, the stem portion 4 and the head portion 8 of the surface penetrating fastening device 2 remain the same but the arm portion 40 is changed. The portion 42 of the arm portion 40, that is moved into a superposed relationship with a portion of the front surface 18, has a width that is greater than fifty percent of the width W of the front surface 18. The portion 44 tapers from a location adjacent to the portion 42 to a location adjacent to the head portion 8. As in FIGS. 1–5, the stem portion 4 and the bore 22 have rectangular cross-sectional configurations to prevent any relative rotational movement therebetween. The surface penetrating fastening device 2 and the housing 10 are formed from the same materials as described above. The cable clip of FIGS. 6 and 7 is installed in the same manner as the cable clip in FIGS. 4 and 5.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A cable clip for use in attaching a cable to a support comprising:
   a housing having at least top and bottom surfaces, two opposite side surfaces and front and back surfaces,
   said bottom surface having a cable receiving channel formed therein;
   said housing having a bore extending therethrough and having an opening in said top surface and an opening in said bottom surface;
   a surface penetrating fastening device having a stem portion and an integral arm portion projecting outwardly from said stem portion;
   at least a portion of said stem portion being located in at least a portion of said bore so that said arm portion is spaced from and extends over said top surface; and
   said arm portion having a bottom surface so that when a force is applied to said surface penetrating fastening device to drive said stem portion into said support at least a portion of said bottom surface of said arm portion will be superposed over at least a portion of said top surface and at least another portion of said bottom surface of said arm portion will be superposed over at least a portion of said front surface.

2. A cable clip as in claim 1 wherein:
   said bore and said stem portion having cross-sectional configurations that prevent relative rotational movement therebetween.

3. A cable clip as in claim 1 wherein:
   at least portions of said superposed portions being in a contacting relationship.

4. A cable clip as in claim 3 wherein:
   said bore and said stem portion having cross-sectional configurations that prevent relative rotational movement therebetween.

5. A cable clip as in claim 1 wherein:
   said housing is formed from a plastic material; and
   said surface penetrating fastening device is formed from a metallic material.

6. A cable clip as in claim 5 wherein:
   said bore and said stem portion having cross-sectional configurations that prevent relative rotational movement therebetween.

7. A cable clip as in claim 6 wherein:
   said arm portion having the same cross-sectional configuration as said stem portion.

8. A cable clip as in claim 1 wherein:
   said at least a portion of said bottom surface of said arm portion superposed over said top surface tapers from a first location adjacent to said at least another portion to a second location adjacent to said stem portion.

9. A cable clip as in claim 8 wherein:
   said bore and said stem portion having cross-sectional configurations that prevent relative rotational movement therebetween.

10. A cable clip as in claim 9 wherein:
    at least portions of said superposed portions being in a contacting relationship.

11. A cable clip as in claim 10 wherein:
    said housing is formed from a plastic material; and
    said surface penetrating fastening device is formed from a metallic material.

12. A cable clip as in claim 1 wherein:
    said surface penetrating fastening device having a head portion for receiving said application of force.

13. A cable clip as in claim 12 wherein:
    said stem portion having a smooth outer surface; and
    said bore and said stem portion having cross-sectional configurations to prevent relative rotational movement therebetween.

14. A cable clip as in claim 12 wherein:
    said at least a portion of said bottom surface of said arm portion superposed over said top surface tapers from a first location adjacent to said at least another portion to a second location adjacent to said stem portion.

15. A cable clip as in claim 14 wherein:
    said bore and said stem portion having cross-sectional configurations that prevent relative rotational movement therebetween.

16. A cable clip as in claim 14 wherein:
    said another portion having a width that is greater than fifty percent of the width of said front surface.

17. A cable clip as in claim 1 wherein:
    said at least another portion has a width that is greater than fifty percent of the width of said front surface.

18. A cable clip as in claim 17 wherein:
    said at least a portion of said bottom surface of said arm portion superposed over said top surface tapers from a first location adjacent to said at least another portion to a second location adjacent to said stem portion.

19. A cable clip as in claim 18 wherein:
    said bore and said stem portions having cross-sectional configurations that prevent relative rotational movement therebetween.

20. A cable clip as in claim 19 wherein:
    said housing is formed from a plastic material; and
    said surface penetrating fastening device is formed from a metallic material.

* * * * *